United States Patent

[11] 3,621,384

[72] Inventor Kazuo Yamada
14-20 Nichome, Benten, Minato-ku, Osaka, Japan
[21] Appl. No. 842,221
[22] Filed July 16, 1969
[45] Patented Nov. 16, 1971
[32] Priorities July 19, 1968
[33] Japan
[31] 43/51478;
Oct. 29, 1968, Japan, No. 43/78724

[54] APPARATUS FOR LOCATING A SHORT CIRCUIT IN A DC WIRING
3 Claims, 9 Drawing Figs.

[52] U.S. Cl. ............................................. 324/52
[51] Int. Cl. ........................................... G01r 31/08
[50] Field of Search ................................. 324/52, 133; 340/250, 255

[56] References Cited
UNITED STATES PATENTS

| | | | |
|---|---|---|---|
| 2,127,216 | 8/1938 | Hallden et al. | 324/52 |
| 2,291,533 | 7/1942 | Cummings | 324/52 X |
| 2,651,021 | 9/1953 | Hays | 324/52 |
| 2,698,921 | 1/1955 | Wharton | 324/52 |
| 2,716,216 | 8/1955 | Schwenzfeier | 324/52 X |
| 2,993,167 | 7/1961 | Smith | 324/52 |
| 3,441,842 | 4/1969 | Sturm | 324/52 |

Primary Examiner—Gerard R. Strecker
Attorney—Irving M. Weiner

ABSTRACT: Apparatus for locating a short circuit in the wiring of a DC circuit having current-intermitting means connected in parallel with a power supply fuse of the circuit for intermittently conducting a current from a power source of the circuit to the wiring when the fuse is blown. A searching unit includes a search coil for detecting an alternating field formed around a portion of the wiring through which the intermitting current flows. The current-intermitting means includes a voltage detector for generating output signals when the voltage applied to the opposite terminals of the current-intermitting means due to blowing of the fuse reaches such a high voltage as applied if any point of the wiring is short circuited. The current-intermitting means also includes means for supplying periodic pulses into the wiring by intermittently connecting the power source to the wiring when the means for supplying periodic pulses receives actuate signals from the preselected voltage detector.

INVENTOR
KAZUO YAMADA
BY
Irving M. Weiner
ATTORNEY

APPARATUS FOR LOCATING A SHORT CIRCUIT IN A DC WIRING

BACKGROUND OF THE INVENTION

This invention relates to apparatus for locating a short circuit in a DC wiring, particularly in the DC wiring for lamps, a warning horn and other electrical equipments of an automobile.

Usually, accidents to electrical devices of an automobile are mostly short circuit ones, as is seen in consideration of the fact that the wiring for the electrical devices is installed in the running body, "automobile." In repairing it, if a primitive procedure is followed in which one searches for a short-circuited place by a visual tracing, much labor is required and it is hardly possible to tell how long it will take to find out the short-circuited place, since the length of time expanded will vary greatly according to the place in the wiring where the short circuit has occured.

The primary object of the invention is to provide a new and useful apparatus for locating a short circuit in a DC wiring, which can warn of any overcurrent condition such as a short circuit in the DC wiring and locate easily and quickly the short-circuited place.

Another object of the invention is to provide means for automatically warning of any short circuit in a DC wiring, when occupied, said means being inserted in parallel with a power supply fuse.

A further object of the invention is to provide a new and improved wire tracing device in which the direction toward which the wire tracing device should be moved to find a short circuit place can be indicated.

SUMMARY OF THE INVENTION

Apparatus for locating a short circuit in a DC wiring according to the invention comprises the combination of a current transducer unit for converting a direct current into a periodical current with a searching unit for detecting the periodical current produced by said current transducer.

The current transducer comprises a two-terminal network which is adapted to be inserted in parallel with a power supply fuse in the wiring to be inspected, and converts the direct current into a periodical current such as a rectangular wave to supply the periodical current to the line which is short circuited, when a short circuit occurs in the wiring. The current transducer may include a warning device such as a pilot lamp for warning of any short circuit upon blowing the fuse due to such short circuit. This may be replaced by any other means for indicating, whether said transducer unit is in an operative condition or not.

The current transducer unit, preferably, converts the direct current, supplied from a power source of the wiring to be inspected, into a periodical current, but it may include its own DC power source.

In a preferred embodiment of the invention, the current transducer unit comprises unidirectional conductive means, constant voltage drive means connected in series to said unidirectional conductive means, a rectangular wave oscillator actuated by said constant voltage drive means, pulse generating means energized by said rectangular wave oscillator, said pulse generating means being connected in parallel to said unidirectional conductive means and said constant voltage means, and protective resistance means connected in series to said pulse-generating means and in parallel to said unidirectional conductive means and said constant voltage drive means.

On the other hand, the searching unit, preferably, comprises a searching head for inducing pulses in response to said periodical current flowing in the wiring to be inspected a clipper for eliminating noises from said pulse induced by said searching head, and means for changing effective output, pulses from the clipper to sound and/or visible signals. The searching head may consist of a magnetically conductive core and a coil wound thereon. In order to change effective output pulses from the clipper to sound signals, the searching unit may include an audiofrequency oscillator, gate means, driven by the output pulses from the clipper to gate the oscillation output from said audiofrequency oscillator and means for generating sound signals responsive to the output signals from said gate means.

Each of the pulses in the periodical current produced by the current transducer unit may have such a form that its rise time and fall time differ from each other by a predetermined amount so that pulses of different polarities induced by an inductance of the searching hand may have different magnitudes. In such the case like this, the clip levels of the clipper at the opposite polarity sides can be so set that there may be two cases for the output signals from the clipper: one in which the pulses at the opposite polarity sides can be taken up and the other in which only the pulses having the larger magnitude can be taken up at either one of the opposite polarity sides. This is helpful to determine the direction toward which the wiring should be traced to reach a short circuit place.

BRIEF DESCRIPTION OF THE DRAWINGS

The invention will be fully understood from the following description taken in connection with the accompanying drawings in which.

DESCRIPTION OF THE PREFERRED EMBODIMENTS

Figure 1:
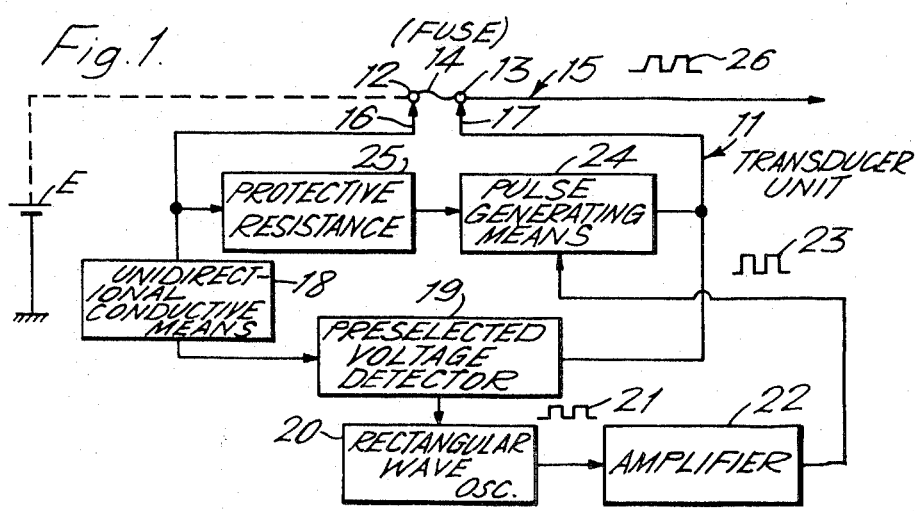
FIG. 1 is a block diagram showing a current transducer unit embodying the present invention.

Referring now to the drawings and particularly to FIG. 1, a transducer unit which is one of the component units of the apparatus according to the invention is generally indicated as 11. The transducer unit 11 comprises a two-terminal network which is adapted to be placed between the opposite terminals 12 and 13 for a power supply fuse 14 which is inserted in a DC wiring 15 to be inspected. The DC wiring leads from a DC power source E, to at least one load. In case of an automobile, the power source E would be a battery and the loads included in the wiring 15 may be various lamps, warning horn and other electrical car accessories. The reference numerals 16 and 17 indicate the input and output terminals of the two-terminal network, respectively.

The network includes unidirectional conductive means 18 and preselected voltage detector 19 which are connected in series between the input and output terminals 16 and 17. When the fuse 14 is blown by a short circuit caused in the wiring 15, an electrical current will flow through unidirectional conductive means 18 and preselected voltage detector 19 if unidirectional conductive means 18 is placed at the input side as shown in FIG. 1. At that time, the current passing through the preselected voltage detector 19 is increased by the short circuit caused in the wiring 15, producing a corresponding voltage drop, which drives a rectangular wave oscillator 20. This rectangular wave oscillator 20, which will be described in detail, hereinafter, may be a free-running multivibrator and, preferably, the period of reversal thereof is less than several seconds. A rectangular wave 21 produced at the oscillator 20 is supplied to an amplifier 22 and the amplified rectangular wave 23 energizes pulse-generating means 24 inserted between the input and output terminals 16 and 17 and connected in series to protective resistance means 25. Protective resistance means 25 and pulse generating means 24 are, accordingly, connected in parallel with unidirectional conductive means 18 and preselected voltage detector.

Figure 4:
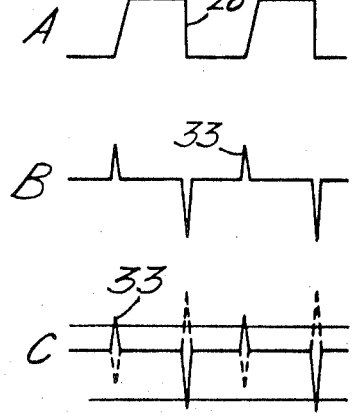
FIG. 4A is a waveform of pulses supplied through the current transducer unit to the wiring to be inspected.
FIG. 4B is the waveform obtained after differentiating that of FIG. 4A.
FIG. 4C shows the waveform of FIG. 4B, clipped by a clipper.

The operation of pulse-generating means 24 is to electrically connect and disconnect the terminals 12 and 13 with regular intervals depending on the period of the rectangular wave 23. If this mechanical switching time between the two terminals 12 and 13 is made such that, for example, as a preferred embodiment of the invention, the opening time is quicker than the closing time, then a trapezoidal continuous pulse 26, which can be shown as idealized in FIG. 4A is supplied toward the load of the wiring 15. The peak value of this continuous pulse may be made smaller than a DC value at the time of the maximum load of the power source E by selecting or regulating the resistance of the protective resistance means 25.

It will be understood that if the current transducer unit 11 shown in FIG. 1 is reversely placed between the terminals 12 and 13, the unit will not work at all owing to the action of the unidirectional conductive means 18 as described above so that there is no danger of damage.

Figure 2:
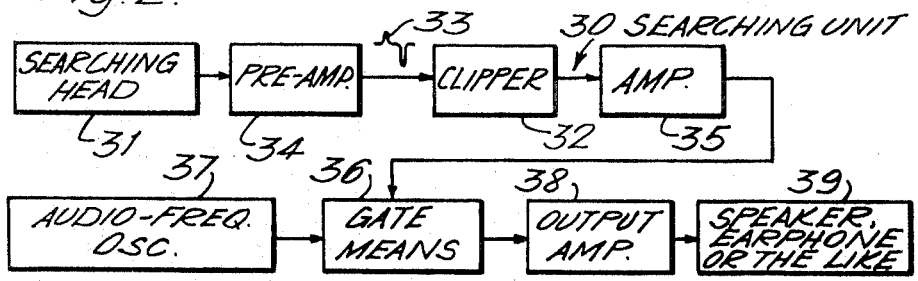
FIG. 2 is a block diagram showing a searching unit embodying the present invention.

The searching or questing unit which is the other component of the apparatus according to the invention is illustrated by way of a block diagram in FIG. 2. The searching unit generally indicated as 30 includes a searching head 31 and a clipper 32. The searching head 31 comprises a suitable magnetically conductive core and a coil wound thereon as described hereinafter in detail referring to FIG. 7.

If the searching head 31, when it approaches the wiring to be inspected, to which a pulse current produced by the beforementioned current transducer unit is being conducted, a sharp voltage wave is induced in response to the rise and fall of the pulse 26 of FIG. 4A. The voltage wave induced in the searching head 31, after being amplified by a preamplifier 34, is supplied to the clipper 32. The amplified wave is shown and indicated as 33 in FIGS. 2 and 4B.

The clipper 32 is to discriminate signals of the wave 33 of the FIG. 4B responsive to the rise and fall of the pulse 26 of FIG. 4A from the other noise signals which will later be described in detail referring to FIG. 3. Preferably, this clipper 32 is of the type having different clip levels at positive and negative sides, wherein if the amplified wave 33 arrives there with the polarity as shown in solid line in FIG. 4C it is supplied to an amplifier 35 in the next stage with its peak portions at both positive and negative sides being above the clip level, whereas if it arrives there with the reverse polarity as shown in the dotted line in FIG. 4C it is supplied thereto with its peak portions only at the plus side being above the clip level. The amplified waveform from said amplifier 35 drives gate means 36. The gate means 36 gates the oscillation output from the audiofrequency oscillator 37 and feeds an output amplifier 38 with a tone-adjusted sound signal having intervals of time in response to the output from the amplifier 35. The output amplifier 38 load is connected to a speaker, earphone, or the like 39 to cause the latter to sound with various tones. It is also possible to produce visible signals as by a pilot lamp at the same time as the sound signals are produced or as a substitute for sound signals.

Figure 3:
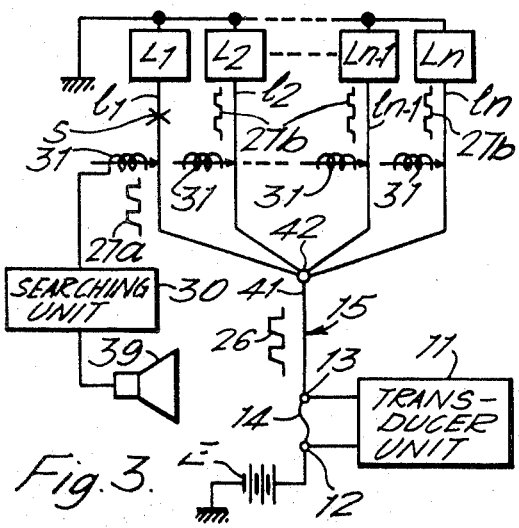
FIG. 3 is a schematic diagram showing the mode of searching for a short-circuited point with the apparatus according to the invention.

FIG. 3 illustrates the mode of searching for a short-circuited place with the apparatus of the invention. The wiring 15 for feeding currents to a plurality of loads $L_1, L_2....L_{n'7E'1}, L_n$ from a single DC power source E via the fuse 14 has branch lines $l_1, l_.....l_{n'7E'1}, l_n$ shown in single lines, respectively. In the case of a short circuit occurring at point S on the branch line $l_1$, the overcurrent blows the fuse 14, so that the current transducer unit 11 feeds the wiring 15 with the continuous pulse 26, which reaches the short circuited point S without any substantial attenuation but does not flow over a portion ranging from the short-circuited point S to the load $L_1$. The pulse current transmitted to the branch line $l_1$ is indicated with the reference numeral 27a. It would be unavoidable that pulse currents of certain small magnitudes flow along other branch lines $l_2....l_n$ $_{'7F_1}, l_n$ owing to the characteristics of the wiring itself, the resistance value of the short-circuited point S and other factors. These pulse currents are indicated with the reference numeral 27b.

Now, if the searching head 31 of the searching unit 30 is moved along the base line 41 of wiring 15 toward the load side, the trapezoidal wave current 26 will naturally excite the questing unit 30 to produce sound signals. The searching head 31 may then be moved along the branch line $l_1$ from the junction point 42 toward the short-circuited point S. At that time, the questing unit 30 will continue to produce sound signals responsive to the pulse current 27a which is a little smaller than but substantially the same as the pulse current 26 until the searching head 31 reach the short-circuited point S. As soon as the searching head 31 passes by the point S toward the load $L_1$, the continuous pulse current 27a disappears, and accordingly, the sounding stops. It follows from this that the particular position of the searching head 31 at which there is a transition from sounding to silence (or from silence to sounding, in the case of the reverse travel) indicates the short-circuited point S.

In cases where the searching head 31 happens to be moved along other branch lines $l_2, ....L_{n'7E'}^1, l_n$ in which no short circuit exists, extreme smallness of each of the pulse currents 27b which are being transmitted therethrough enables the clipper 32 of the unit 30 to shut out any induced currents resulting from said pulse currents, so that no sounding occurs. Therefore, the absence of short circuit in these branch lines is instantly discovered.

Figure 5:
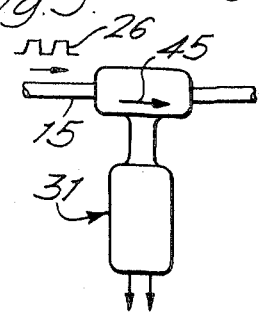
FIG. 5 is a schematic plan view of the searching head which is in a wire tracing condition.

According to a preferred embodiment of the invention, the differentiated amplified wave 33 entering the clipper 32 is so set that it changes its polarity depending on the relative position between the wiring 15 and the searching head 31. For example, when the direction of flow of the current pulse 26 or 27a in the wiring position corresponds with the direction of an arrow 45 indicated in the head 31, as shown in FIG. 5, it takes a polarity shown by the solid line in FIG. 4C and the peaks in both the positive and negative portions are practically used and output sound signals are produced with twofold frequency with respect to the repetition number of current pulses (per unit time. To the contrary, if the relative disposition between the wiring portion 15 and the head 31 is reversed, the frequency of sounding becomes equal to the repetition number of pulses since the amplified wave 33 takes another polarity shown by the dotted line in FIG. 4C. This is very helpful to decide the direction toward which the searching head should be moved to find the short-circuited point.

If a wiring system such as shown in FIG. 3 is so simple that no one can get a clear understanding thereof at a glance, there will be no trouble to find the way to the short-circuited point. However, in case where such system is not so simple, the indication of direction in the above mentioned manner will be very helpful. That is, in order that the searching head 31 may be moved for scanning toward the short-circuited point S as it is transferred from the junction 42 to the branch line $l_1$ where the short-circuited point S exists, it is so oriented that the arrows 45 on the searching head 31 is directed to the direction of flow of said current 26, i.e., higher frequency of sounding is obtained, and scanning is then made, so that the searching head can reach the short-circuited point.

Figure 6:
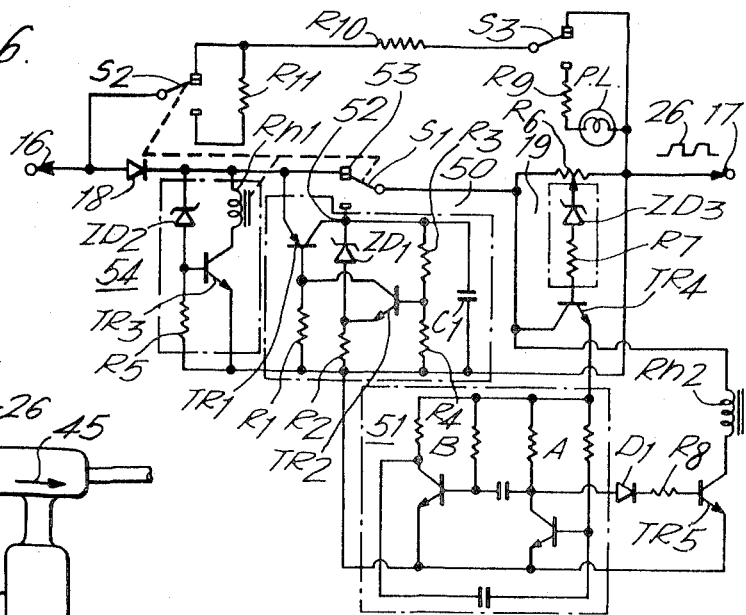
FIG. 6 is a wiring diagram for a preferred embodiment of the current transducer unit.

A preferred embodiment of the current transducer unit is illustrated in FIG. 6. The unidirectional conductive means 13 connected to the input terminal 16 is a usual diode, which is connected in series to preselected voltage detector 19 positioned at the side of the output terminal 17 through a constant voltage circuit 50. The constant voltage circuit is used to maintain the parent power source of a multivibrator 51 at 12 v. in view of the fact that the power source of the wiring $l_n$ an is generally either of 12 v. or of 24 v. It may be a known constant voltage circuit comprising transistors $TR_1$, $TR_2$, a Zener diode $ZD_1$, accessory resistance elements $R_1$, $R_2$, $R_3$, $R_4$, and a capacitor $C_1$. A constant voltage output end 52 provided by the collector to the transistor $TR_1$ is connected to one contact of a double throw switch $S_1$. The other contact of the switch $S_1$ is connected to the cathode of the diode 18. The common contact 53 of $S_1$ is normally closed. When the voltage across the input and output terminals 16 and 17 approaches 24 v. switch drive means 54 acts to connect the common contact 53 of $S_1$ to the output end 52 of the constant voltage circuit 50. The relay $Rh_1$ of the switch drive means 54 is connected in series to the collector-emitter circuit if a transistor $TR_3$ and placed between the output terminal 17 and the cathode of the diode 18. Connected in shunt to the series circuit of relay $Rh_1$ and collector-emitter is the series circuit for Zener diode $ZD_2$ and resistor $R_5$. The junction between $ZD_2$ and resistor $R_5$ is connected to the base of $TR_3$. The breakdown voltage of the zener diode $ZD_2$ is set at about 24 v. so that when the power source of the wiring is at 24 v., the connection of a current of the resistor $R_5$ due to the Zener effect causes the transistor $TR_3$ to be supplied with base current and to become conductive, whereby the relay $Rh_1$ through which the current flows brings the switches $S_1$ and $S_2$ into a state reverse to that shown in FIG. 6.

The preselected voltage detector 28 energized by the power source of about 12 v. on blowing of the fuse can thus judge whether the cause of blowing of the fuse is attributed to an enormous current resulting from short circuit of the like or to an overcurrent simply exceeding the rated current by a predetermined amount, from the degree of the voltage drop due to a voltage drop resister $R_6$ placed between $S_1$ and output end 5. This is achieved by the Zener diode $ZD_3$ connected to the slider (fixed at predetermined point) of the resistor $R_6$ in such a manner that the diode $ZD_3$, which breaks down when an enormous current flows owing to short circuit or the like, excites the transistor $RT_4$ providing a B power source for the multivibrator 51 through the resistor $R_7$. The multivibrator 51 driven thereby reverses with a suitable period and the output from one stage A thereof excites a transistor $TR_5$ through the diode $D_1$ and resistor $R_8$ and a current flows through a relay $Rh_2$ which is connected in series to the transistor $TR_5$ and placed between the common contact 53 and output terminal 17, so that the relay $Rh_2$ shifts a switch $S_2$ to the side where a relatively high resistance $R_9$ and pilot lamp PL exist. The shifting speed at this time, however, is extremely high as compared with the return speed, so that the current 26 supplied thereby to the wiring 15 takes the form of an approximately trapezoidal wave as shown in FIG. 3A, and since the multivibrator 51 reverses with a predetermined period, the transistor $TR_5$ is rendered alternately nonconductive and conductive depending thereon, with the result that a switch $S_3$ is thrown in accordance with this period. The switch $S_2$ and this switch $S_3$ are interconnected through a protective resistor $R_{10}$ and, as described above, the switch $S_2$ is thrown to the side of an additional voltage drop resistor $R_{11}$ when the voltage of the power source of the wiring 15 is 24 v., and the current flowing along $S_2$ −24 3 remains unchanged when $S_2$ has assumed the illustrated positions leading directly to the output and, irrespective of whether source voltage is 12 v. or 24 v.

Thus the substantially trapezoidal pulse in accordance with the period of reversal of the multivibrator 51 is supplied from the output terminal 17 to the wiring 15 as a relatively large current at the illustrated $S_3$ position and as negligible small current at the reverse position.

Figure 7:
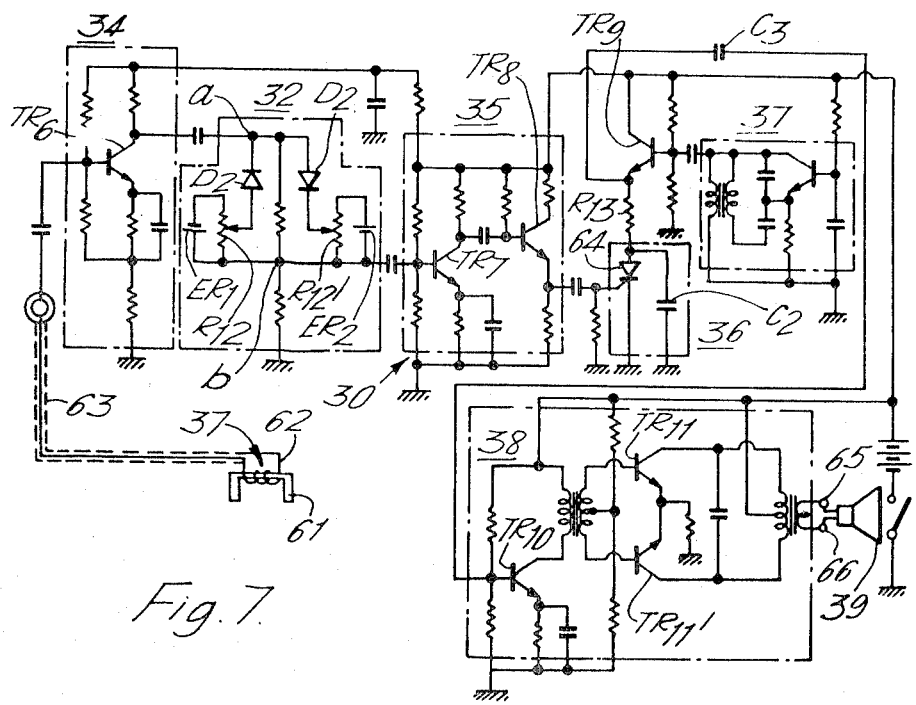
FIG. 7 is a wiring diagram for a preferred embodiment of a searching unit.

FIG. 7 illustrates, by way of example, a preferred embodiment of the searching unit 30. The searching head 31 consists of a suitable magnetically conductive core 61 and a coil 62 would thereon, and as a lead 63 leading to the preamplifier 34, use is made of a shield wire in order that it may not be affected by other electric and magnetic fields than those from the searching head 31. The output amplified by the transistor $TR_6$ of the preamplifier 34 is supplied to a point $a$ of the clipper 32 constituting a positive-negative base clipper consisting of two diodes $D_2$. Power sources $ER_1$, $ER_2$ and resistors $R_{12}$, $R_{12}$, placed between the respective diodes $D_2$ and output end $b$ determine the clipping level of positive-negative input, and as regards the output from the amplifier 34 as the searching head 31 is detecting the pulse current 26 from the wiring 15, it is supplied from point $b$ to a pulse amplifier 35 while allowing peaks either in both positive and negative portions or only in positive portion as shown in FIG. 4C in accordance with the incoming polarity. The pulse amplified output from this amplifier 35 passing from an amplifier transistor $TR_7$ over an emitter-follower transistor $TR_8$ is supplied to the gate terminal of the SCR 64 of a gate circuit 36. The anode of the SCR 64 leads to the load resistor $R_{13}$ of an emitter-follower transistor $TR_9$ and its cathode is connected to an earth line. The base of the emitter-follower transistor $TR_9$ receives the audio frequency oscillation output from a Colpitts oscillation circuit 37, and after an input signal current is supplied to the gate terminal of the SCR depending on this signal, a sound signal adjusted for tone, sweep, etc. by the load resistor $R_{13}$ and capacitor $C_2$ bypassed between the two terminal of the SCR, is supplied to an output amplifier 38 through a coupling capacitor $C_3$ connected to the emitter. The output amplifier by the transistors $TB_{10}$, $TR_{11}$ and $TR_{11}$, of the output amplifier 38 is supplied to a speaker, earphone or the like through the output terminals 65 and 66.

In addition, besides the electromagnetic induction type detector means in this embodiment, it is also possible to utilize electrostatic induction type detector means as a searching head.

What I claim is:

1. Apparatus for locating a short circuit in a wiring of a DC circuit which comprises, in combination:
    current-intermitting means connected in parallel with a power supply fuse of said circuit for intermittently conducting a current from a power source of said circuit to said wiring when said fuse is blown;
    a searching unit having a search coil for detecting an alternating field formed around a portion of said wiring through which the intermitting current flows; and
    said current-intermitting means including a voltage detector for generating output signals when the voltage applied to the opposite terminals of said current intermitting means due to blowing of said fuse reaches a predetermined high voltage as a result of any point of said wiring being short circuited, and means for supplying periodic pulses into said wiring by intermittently connecting said power source to said wiring when said means for supplying periodic pulses receives the output signals from said voltage detector.

2. Apparatus for locating a short circuit in a wiring of a DC circuit as defined in claim 1, in which said current-intermitting means further includes unidirectional conductive means for actuating said current-intermitting means only when the parallel connection of said current-intermitting means with said fuse is held at a predetermined correct polarity for the normal operation of all the elements constituting said current-intermitting means.

3. Apparatus for locating a short circuit in a wiring of a DC circuit as defined in claim 1, in which said current-intermitting means further includes a constant voltage circuit having an output terminal connected to said voltage detector for providing the normal operation of said voltage detector and said pulse supply means irrespective of the value of said power supply voltage.

* * * * *

PO-1050
(5/69)

UNITED STATES PATENT OFFICE
CERTIFICATE OF CORRECTION

Patent No. 3,621,384          Dated November 16, 1971

Inventor(s) Kazuo Yamada

It is certified that error appears in the above-identified patent and that said Letters Patent are hereby corrected as shown below:

In the cover sheet the number of Drawing Figs. shown as "9" should read --7--.

Signed and sealed this 11th day of July 1972.

(SEAL)
Attest:

EDWARD M. FLETCHER, JR.          ROBERT GOTTSCHALK
Attesting Officer                Commissioner of Patents